(12) United States Patent  
Zoellner (10) Patent No.: US 8,131,546 B1  
(45) Date of Patent: Mar. 6, 2012

(54) SYSTEM AND METHOD FOR ADAPTIVE SENTENCE BOUNDARY DISAMBIGUATION

(75) Inventor: Keith Zoellner, Austin, TX (US)

(73) Assignee: Stored IQ, Inc., Austin, TX (US)

( * ) Notice: Subject to any disclaimer, the term of this patent is extended or adjusted under 35 U.S.C. 154(b) by 1102 days.

(21) Appl. No.: 11/965,934

(22) Filed: Dec. 28, 2007

Related U.S. Application Data

(60) Provisional application No. 60/878,381, filed on Jan. 3, 2007.

(51) Int. Cl.
*G10L 17/00* (2006.01)
(52) U.S. Cl. .............. 704/248; 704/253; 704/1; 704/4; 704/9
(58) Field of Classification Search ............ 704/248, 704/253, 1, 9, 4
See application file for complete search history.

(56) References Cited

U.S. PATENT DOCUMENTS 5,995,920 A * 11/1999 Carbonell et al. ............ 704/9

(Continued)

OTHER PUBLICATIONS http://www.research.ibm.com/IE/, Trainable Information Extraction Systems, Dec. 22, 2006.

(Continued)

*Primary Examiner* — Qi Han
(74) *Attorney, Agent, or Firm* — Sprinkle IP Law Group (57) ABSTRACT

Embodiments disclosed herein provide a system and method useful for pre-processing non-sentence text extracted from business documents (e.g., malformed bulleted lists, runaway sentence identification, spatially separated data, etc.). One embodiment includes two heuristic algorithms: one searches for sentences in a document and another looks for non-sentences (e.g., lists, tables, tabs, names of people, addresses, etc.) in the same document. In one embodiment, when malformed text is encountered, a particular character (e.g., "?") is inserted to signify to a natural language processing layer that this set of "words" represent a logical construct and should be evaluated independent of other sentences. Embodiments disclosed herein allow non-sentence text, which is linguistically dry but contextually rich, be included in the natural language processing. Embodiments disclosed herein also facilitate to reduce false positive concept extraction assertions by the natural language processing layer.

18 Claims, 4 Drawing Sheets

File Processing Pipeline

U.S. PATENT DOCUMENTS

| | | | |
|---|---|---|---|
| 6,052,656 | A | 4/2000 | Suda |
| 6,188,977 | B1 | 2/2001 | Hirota |
| 6,470,306 | B1 * | 10/2002 | Pringle et al. ............... 704/3 |
| 2005/0080613 | A1 * | 4/2005 | Colledge et al. ............ 704/9 |
| 2007/0073533 | A1 * | 3/2007 | Thione et al. ............... 704/9 |

OTHER PUBLICATIONS

Adaptive Multilingual Sentence Boundary Disambiguation, Association for Computational Linguistics, vol. 23, No. 2, pp. 241-267, 1997.

* cited by examiner

| Classification Pipeline 300 | Object Classification Rules Engine 326 | | | |
|---|---|---|---|---|
| | Entity Processing 305 | User Level Entity Assertion 324 | | |
| | | Proximity Analysis 322 | | |
| | | Filtering/Scoping 320 | | |
| | Content-based Metadata Processing 303 | Keyword Extraction 314 | Raw Entity Extraction 316 | Text Pattern Extraction 318 |
| | | Text Conversion 312 | | |
| | | Content Typing 310 | | |
| | | Duplicate Hash Computation 308 | | |
| | Object System Metadata Processing 301 | User Directory Extraction 306 | | |
| | | Security Extraction 304 | | |
| | | Object System Metadata Extraction 302 | | |

SYSTEM AND METHOD FOR ADAPTIVE SENTENCE BOUNDARY DISAMBIGUATION

CROSS-REFERENCE TO RELATED APPLICATIONS

The present application claims priority from U.S. Provisional Application No. 60/878,381, filed Jan. 3, 2007, entitled "SYSTEM AND METHOD FOR ADAPTIVE SENTENCE BOUNDARY DISAMBIGUATION," the entire content, appendices included, of which is incorporated herein by reference for all purposes. This application also relates to U.S. patent application Ser. No. 11/524,831, filed Sep. 21, 2006, entitled "SYSTEM AND METHOD FOR CLASSIFYING OBJECTS," the entire content of which is fully incorporated herein by reference.

TECHNICAL FIELD OF THE DISCLOSURE

The present invention relates generally to natural language processing and more particularly to an adaptive sentence boundary disambiguation system and method useful for pre-processing documents for natural language processing engines.

BACKGROUND OF THE RELATED ART

Natural Language Processing (NLP) is a cognitive science discipline drawing on computational linguistics and artificial intelligence in the study of automated generation and understanding of natural human languages. In general, natural language generation systems convert information from computer databases into human languages, and natural language understanding systems convert audio/text samples of a human language into digital representations that are easier for computer programs to manipulate.

Natural language understanding is an extremely complicated problem with many contributing factors. One is that the grammar for natural languages is syntactically ambiguous. Often there are multiple possible parse trees for a given sentence. Choosing the most appropriate one usually requires semantic and contextual information. Another contributing factor to the problem of natural language understanding is sentence boundary disambiguation, which refers to the process of deciding where the beginning and ends of sentences are.

In the field of natural language processing, the most accurate systems often involve machines capable of supervised learning. These machines can, with supervised learning, extract information from text in natural language and produce text with sentence boundaries disambiguated. Specifically, a supervised learning machine may perform, via one or more language processing modules, tokenization, part-of-speech lookup, and classification by learning algorithm, etc. Prior natural language processing systems capable of sentence boundary disambiguation can take time and money to develop and require special expertise in linguistics, computational linguistics, as well as artificial intelligence.

As natural languages continue to evolve, so do natural language processing systems. Thus, there is always room for improvement.

SUMMARY

Sentence boundary disambiguation is an important aspect in developing practical text processing applications. Embodiments disclosed herein can significantly improve the performance of a natural language processing engine by turning non-sentence text in a document into sentences and/or other recognizable language structures that can be efficiently and accurately processed.

More specifically, embodiments disclosed herein operate to "pre-process" text for processing by a Natural Language Processing (NLP) Layer comprising one or more NLP engines. These NLP engines break down the sentences in the text, which has been normalized with unambiguous boundaries, into their parts of speech in order to obtain sufficient context to distinguish certain "concepts" from one another.

Traditionally, Natural Language Processors do not function well if the sentences are not well formed. However, malformed sentences are prevalent in business communications today in word processing documents, spreadsheets and presentations. Today's word processing documents commonly contain run-on sentences, malformed lists and tables of information. Likewise, spreadsheets and presentation documents contain fragmented and partial sentences.

To combat the issue of malformed sentences and deliver superior Natural Language Processing and Concept Extraction, embodiments disclosed herein provide a layer of pre-processing that, particularly in processing text extracted from business documents, addresses the following issues: malformed bulleted lists, runaway sentence identification, and spatially separated data. In one embodiment, when one of these malformed sentences is encountered, a particular character (e.g., "?") is inserted to signify to the NLP layer that this set of "words" represent a logical construct and should be evaluated independently of other sentences. Without this layer of pre-processing, the NLP layer would erroneously produce concepts that spanned sentences and logical thought boundaries yielding false positive concept extraction assertions. This pre-processing functionality can be particularly useful in an enterprise environment.

One embodiment includes two heuristic algorithms. The first heuristic algorithm is translatable to search for sentences in a document. The second heuristic algorithm is translatable to look for non-sentences (e.g., lists, tables, tabs, names of people, addresses, etc) in the same document.

One embodiment of the second heuristic algorithm is referred to as the list detection algorithm. The list detection algorithm implements the following functionality:
1. The ability to look for lines in a document and determine whether a list exists.
2. The ability to look for spaces and tabs in a document and determine whether a list exists.
3. The ability to look for malformed sentences in a document and determine whether a list exists.

As language is changing, so is the rule which defines what a sentence is. In this regard, embodiments disclosed herein can be readily adapted to the changing nature of human languages and customized to suit various needs. For example, a customer might be interested in finding the essence of business communication in the documents. Embodiments disclosed herein can deliver not only the content derived from language which is derived sentences but also the context of the content derived from other textual information such as lists and tables.

These, and other, aspects of the disclosure will be better appreciated and understood when considered in conjunction with the following description and the accompanying drawings. The following description, while indicating various embodiments and numerous specific details thereof, is given by way of illustration and not of limitation. As one skilled in the art can appreciate, many substitutions, modifications, additions, or rearrangements may be made within the scope and the spirit of the disclosure.

BRIEF DESCRIPTION OF THE DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings, wherein identical reference numerals designate the same or similar components Note that the features illustrated in the drawings are not necessary drawn to scale.

DETAILED DESCRIPTION

The invention and the various features and advantageous details thereof will now be described with reference to the exemplary, and therefore nonlimiting, embodiments that are illustrated in the accompanying drawings. Descriptions of known programming languages and techniques, networking, communications and computer software and hardware, operating platforms and protocols may be omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In many natural languages, particularly English, the boundary of a sentence can be ambiguous. Adding to the difficulty of natural language processing, the end-of-sentence punctuation marks themselves are often ambiguous. Specifically, the character period or '.' can be ambiguous as it is also used for many other purposes. For example, it can denote a decimal point, an abbreviation, the end of a sentence, or an abbreviation at the end of a sentence. Exclamation points and question marks can occur within quotation marks or parentheses as well as at the end of a sentence. Ellipsis, a series of periods ( . . . ), can occur both within sentences and at sentence boundaries. Conventional natural language processing engines typically have some kind of ability to process, to a certain degree of accuracy, sentences or some derivation thereof. Categorically, however, they are not capable of handling text which may not have any sentence structures (e.g., lists, tables, tabs, spaces, text patterns, etc.). The non-sentence text may not have the usual boundary of a sentence (e.g., a sentence usually ends with a period or a question mark) and thus can be even more ambiguous.

Although the non-sentence text can be linguistically dry, they can provide rich context. In the business world, non-sentence text can be an important source of information as many business documents (e.g., presentation slides, tables, flow charts, lists, spreadsheets, etc.) do not necessarily contain sentences or text with unambiguous boundary. Since natural language processing engines generally first strip off formatting information (e.g., carriage returns automatically inserted by word processing software) from a document, the lack of linguistic formality (e.g., unambiguous sentence boundary) can be a problem.

Embodiments disclosed herein provide a system and method that can significantly improve the performance of a natural language processing engine by turning non-sentence text in a document into sentences and/or other recognizable language structures that can be efficiently and accurately processed. In one embodiment, such a pre-processed document is referred to as a "normalized" document. In embodiments disclosed herein, a normalized sentence refers to a valid set of contextually related information which has a defined boundary and which may or may not be grammatically correct.

One embodiment disclosed herein involves running a first heuristic algorithm on a document to search for sentences and a second heuristic algorithm looking for non-sentences such as lists, tables, tabs, names of people, addresses, and so on.

One embodiment of the second heuristic algorithm is referred to as the list detection algorithm. The list detection algorithm implements the following functionality:

1. The ability to look for lines in a document and determine whether a list exists. A list is found if four consecutive lines are found to contain three or less words each.

2. The ability to look for spaces and tabs in a document and determine whether a list exists. A list is found if words are separated by three consecutive spaces or a tab.

3. The ability to look for malformed sentences in a document and determine whether a list exists. A list is found if there are 45 or more words without a proper end-of-sentence mark. This is needed to detect a list containing more than three words per line.

All of the above parameters are configurable. One embodiment embeds question marks as sentence disambiguators. In this case, the question mark is considered the least ambiguous of all characters. Thus, if a list is discovered, items in the list are separated by '?', establishing a sentence boundary and encapsulating the relevant contextual information thereof. As an example, if four consecutive lines are found to contain three or less words each, the lines in the list are separated by '?'. Similarly, if words are separated by three consecutive spaces, each space is replaced by '?' and if words are separated by a tab, every tab is replaced by '?'.

Other disambiguators may be used.

The algorithm does not count salutations (Mr., Mrs., Dr., etc. as punctuations). Additionally, the algorithm has an address detection logic for detecting addresses in a document. More specifically, the address detection logic operates to check if a line contains names of U.S. States and Canadian provinces and check if the previous line starts with the street number or Postal Office box. If an address is found, it is recognized as an address and the lines are not separated.

One embodiment disclosed herein is embodied in a content typing module. One embodiment of the content typing module may use natural language to tag content as opposed to just words. In one embodiment, the content typing module can be part of a classification pipeline in a file processing system. Such a classification pipeline can tag things (e.g., entities) extracted from an object (e.g., a document) and evaluate the tagged entities to predetermined rules which may serve various purposes (e.g., business policies, regulations, etc.). Natural language entities are one of the types of entities that can be useful in the classification pipeline. An exemplary classification pipeline is disclosed in pending U.S. patent application Ser. No. 11/524,831, filed Sep. 21, 2006, entitled "SYSTEM AND METHOD FOR CLASSIFYING OBJECTS," the entire content of which is fully incorporated herein by reference.

Figure 1:
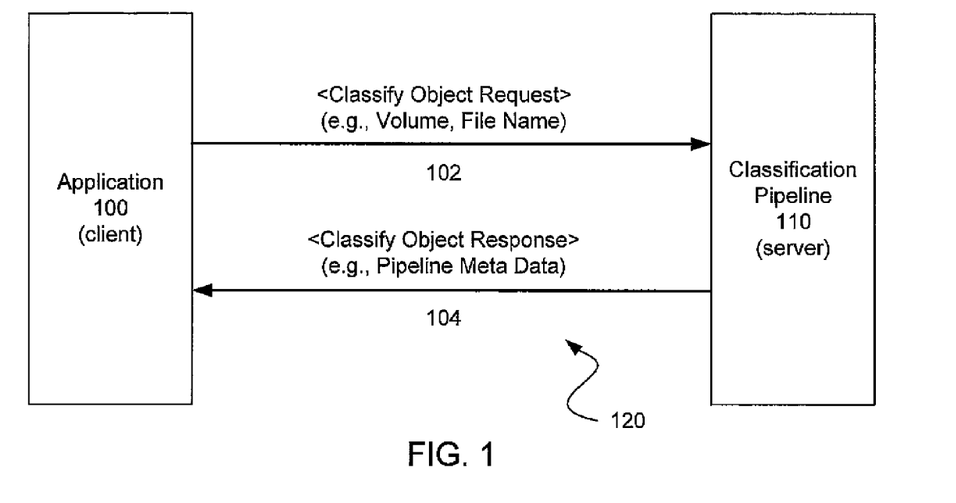
FIG. 1 depicts a block diagram illustrating a synchronous integration flow of a classification pipeline in which some embodiments disclosed herein may be practiced.
Figure 2:
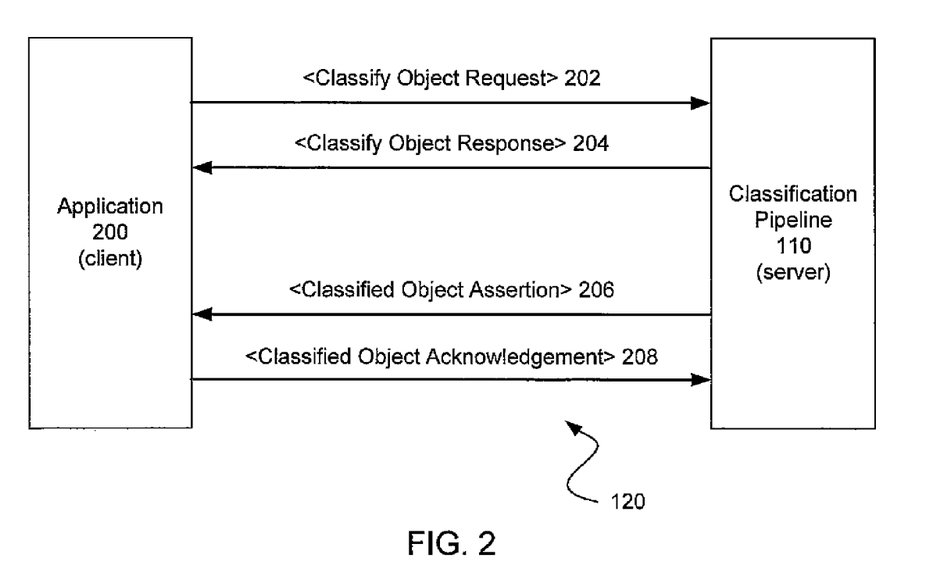
FIG. 2 depicts a block diagram illustrating an asynchronous integration flow of a classification pipeline in which some embodiments disclosed herein may be practiced.
Figure 3A:
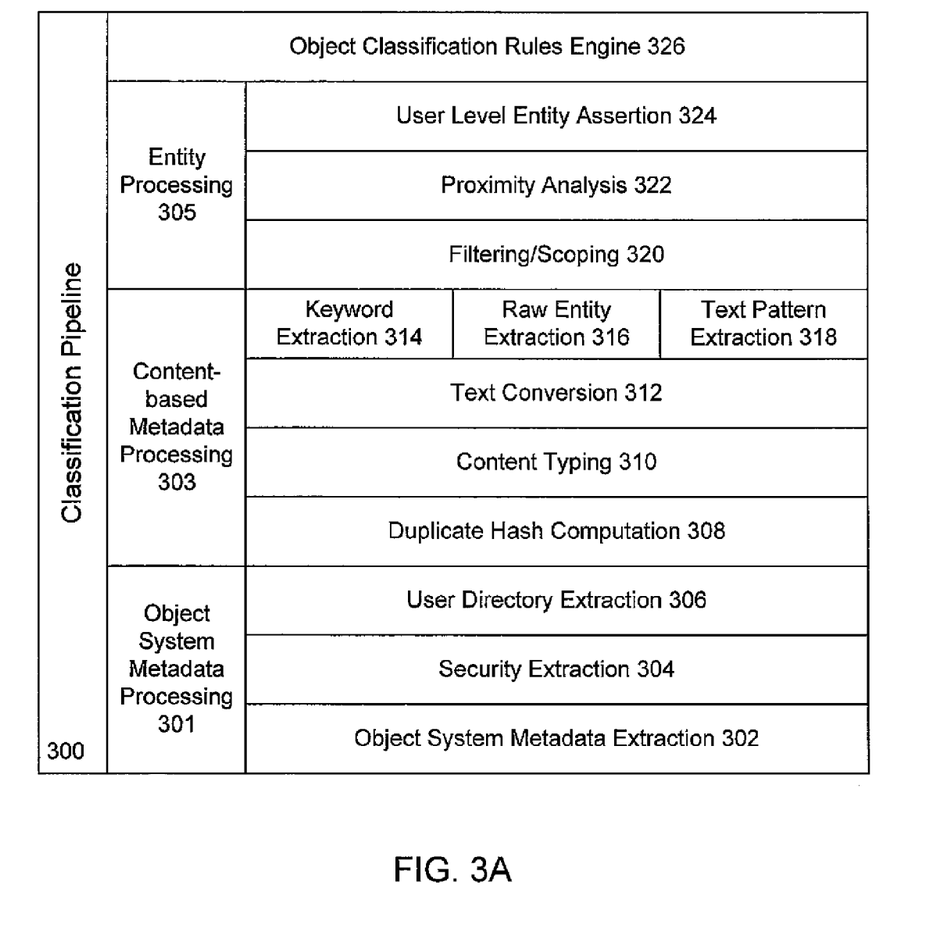
FIGS. 3A and 3B are block diagrams depicting embodiments of a classification pipeline in more detail.
Figure 3B:
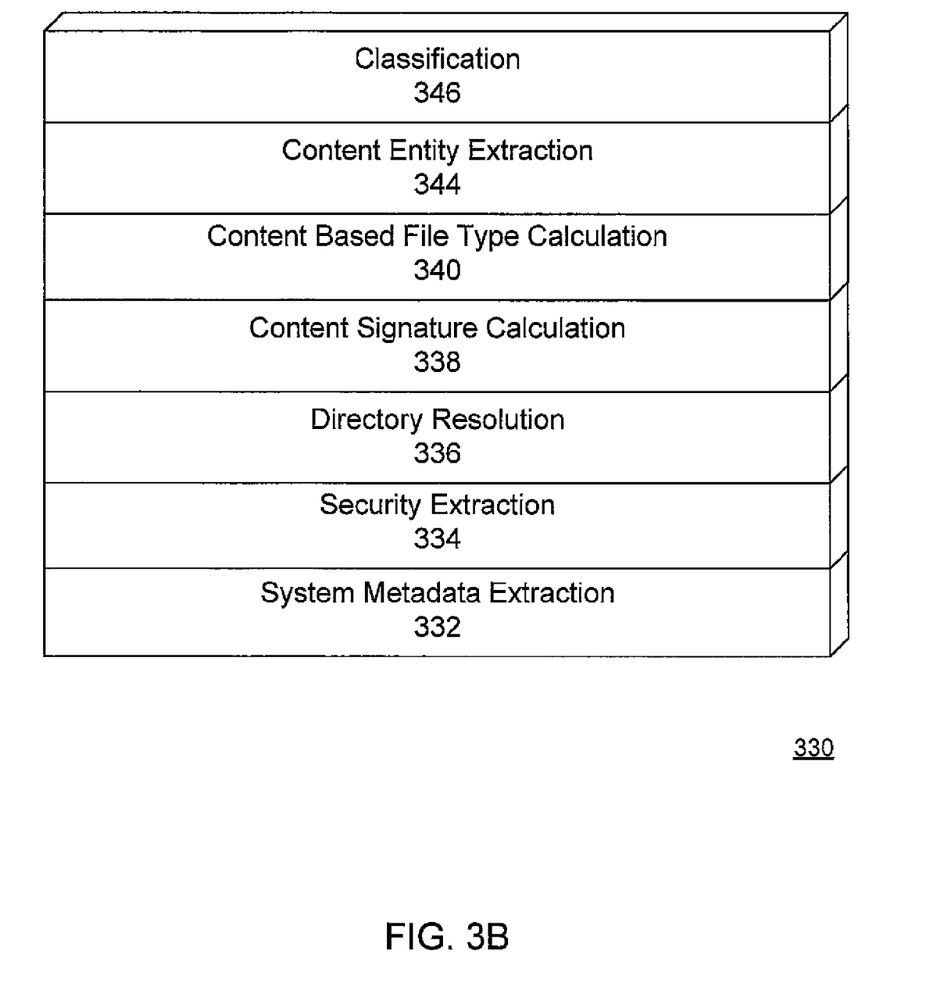

FIGS. 1-3 are block diagrams illustrating one embodiment of a classification pipeline configured to provide a set of tagging and extraction services. The classification pipeline disclosed herein may be embodied in computer-executable program instructions residing on one or more computer-readable storage media. In one embodiment, a system implementing the classification pipeline disclosed herein is programmed with computer-executable program instructions for extracting and/or analyzing the data of files or other objects in the filesystem (collectively referred to as objects) or metadata pertaining to these objects, in order that the objects may be classified and/or certain actions taken based on the classification of the object. Actions (e.g., executing a business policy, harvesting metadata, generating a report, etc.) may be taken based upon the classification of the object or based upon metadata associated with the objects.

The tagging and extraction services provided by the classification pipeline can be made available to one or more clients (i.e., machines running client software) through an interface, referred to herein as the "classification pipeline interface" or simply "the interface". The interface may be implemented in various ways. For example, it may be implemented as an application web interface or an Applications Programming Interface (API). It may be implemented as a single synchronous interface or a set of asynchronous interfaces. One example of a synchronous interface for a classification pipeline is described below with reference to FIG. 1. One example of a set of asynchronous interfaces for a classification pipeline is described below with reference to FIG. 2. In both examples, the classification pipeline configuration can be controlled through the interface, which is implemented as an API exposed as a series of XML request and replies over TCP.

A synchronous interface implementing embodiments disclosed herein may comprise two components: the Classify Object Request and the Classify Object Response. The Classify Object Request is designed to pass a set of parameters to the classification pipeline for a single file. The metadata for the specified file is extracted and passed back to the requesting application on the Classify Object Response. The interface of this type may be referred to as an "Object_Classify_Request interface".

In one embodiment, the Classify Object Request can pass at least two types of parameters: required and optional. Required parameters may include File Name (i.e., the name of the file to be classified) and Volume (i.e., the volume where the file is located.) Optional parameters for the Classify Object Request may include Pipeline Profile Name, Object System Metadata, External Metadata, etc. Readers are directed to the above-referenced U.S. patent application Ser. No. 11/524,831 for more information on these parameters.

There are many different types of metadata, including metadata about electronic documents created by client applications, Document metadata describes document attributes such as the title, author, content, location, and date of creation. Since it is often possible to view a history of every change ever made to an electronic document during its lifetime, acquiring this type of information can help in "historicizing" and/or classifying the document. Document metadata can include edits and comments made by the author and other users to a document as well as hidden information about the document. Exemplary document metadata may include one or more of the following: text changes, comments, document versions, document revisions, template information, file properties and summary information, author's name, author's initials, author's email address, company or organization's name, name of the computer on which it is created, name of the hard disk, volume, or network server on which the document is saved, routing information, names of previous authors, hyperlinks, macros, hidden text, and non-visible portions of embedded Object Linking and Embedding (OLE) objects, etc.

FIG. 1 depicts a block diagram illustrating one embodiment of a synchronous integration flow of a classification pipeline. API 120 can be used by any type of software application to interface with the classification pipeline. For example, Application 100 may wish to receive information pertaining to a certain object or to a certain location on a particular filesystem. More details on the term "object" will be described below with reference to FIGS. 3-5. To obtain this information on the object, Application 100 may send a <Classify Object Request> 102 ("request 102") to Classification Pipeline 110 with information pertaining to the object on which Application 100 wishes to receive information. The information pertaining to the object sent via request 102 may include information such as the volume on which the object is located or the name of the object.

To facilitate the sending of request 102 (and possibly of response 104 to request 102), request 102 may be formulated according to API 120 or any suitable API that Classification Pipeline 110 is operable to implement. Classification pipeline 110 may then obtain or extract metadata on or about the object, and/or classify the object according to a set of classification parameters. In one embodiment, the metadata extracted or obtained on the object may be dependent on a level of service specified in conjunction with Classification Pipeline 110.

In response to request 102, Classification Pipeline 110 may send a <Classify Object Response> 104 ("response 104"). Response 104 may contain information pertaining to the object on which information was requested in request 102. This information on the object may be metadata pertaining to the object (e.g., Pipeline Metadata) or data contained by the object, or a classification of the object, or tagged entities that were found within the content of the object. In one embodiment, metadata in response 104 may be formulated as an XML string.

The interaction with Classification Pipeline 110 depicted in FIG. 1 may occur in a synchronous manner. As an example, Application 100 may send request 102 to Classification Pipeline 110, which in turn will respond with response 104 to the same Application 100 when metadata has been obtained on the object, or the object has been classified. In some cases, it may be desirable to have separate, asynchronous interactions, such that a request pertaining to an object may be sent by one application and the metadata or classification information about that object may be sent to, or obtained by, another distinct application, portion of application or location.

FIG. 2 depicts a block diagram illustrating one embodiment of an asynchronous integration flow of a classification pipeline. In this example, Application 200 may send a <Classify Object Request> 202 ("request 202") to Classification Pipeline 110 with information pertaining to the object on which Application 200 wishes to receive information. The information pertaining to the object sent via request 202 may include information such as the volume on which the object is located or the name of the object. Request 202 may also contain information on the location to which a response to request 202 is to be delivered, such as to what application the response should be delivered, what portion of an application the response should be delivered, or if the response should be stored etc. To facilitate the sending of request 202, request 202 may be formulated according to API 120 or any suitable API that Classification Pipeline 110 is operable to implement.

In response to this initial request 202, Classification Pipeline 110 may send a <Classify Object Response> 204 ("response 204") indicating that request 202 has been received by Classification Pipeline 110 and that information will be delivered to the requested application/location. Classification Pipeline 110 may then operate to obtain or extract metadata on or about the object, or to classify the object according to a set of classification parameters. In one embodiment, the metadata extracted or obtained on the object may be dependent on a level of service specified in conjunction with Classification Pipeline 110.

Once this information has been obtained, Classification Pipeline 110 may send a <Classified Object Assertion> 206 ("response 206"). Response 206 may contain information pertaining to the object on which information was requested in request 202, and may be sent to the location, application or portion of application specified in request 202. Although response 206 is depicted in FIG. 2 as being sent to Application 200, this is for the convenience of depiction and for the purpose of illustration only. Response 206 may be delivered to another application (not shown), a location (not shown), or a certain procedure or portion of Application 202. This information on the object may be metadata pertaining to the object or data contained by the object, or a classification of the object. In one embodiment, metadata in response 206 may be formulated as an XML string. Upon receiving response 206, Application 200 (or a portion of Application 202) may send a <Classified Object Acknowledgement> 208 ("response 208") acknowledging that the information pertaining to the object has been received.

FIGS. 3A and 3B are block diagrams depicting embodiments of a classification pipeline in more detail. As shown in FIG. 3A, in one embodiment, Classification Pipeline 300 may comprise a plurality of layers through which metadata can be obtained and/or processed for submission to Object Classification Rules Engine 326. The term "layers" is representative of the various ways in which the functionality of Classification Pipeline 300 may be implemented (e.g., services, stages, etc.). In one embodiment, the functionality of Classification Pipeline 300 can be divided into three levels (Object System Metadata Processing 301, Content-based Metadata Processing 303, and Entity Processing 305).

Object System Metadata Processing 301 may comprise layers 302, 304, and 306 for extracting system-level metadata which pertains to the keeper of the object (e.g., the system on which the object resides, the surrounding systems, the type of filesystem on which the object resides, the security settings pertaining to the object, other filesystem information such as user directories, etc.). Current filesystems generally provide ample amounts of system metadata. Object System Metadata Extraction 302 may operate to extract raw system metadata pertaining to the location and type of filesystem on which an object resides. This can be done by using the volume parameter passed in on the <Object Classification Request>. Each volume has a system type. Object System Metadata Extraction 302 may operate to map available attributes based on the system type. The type of volume is extensible (i.e., new system types can be readily added). Object System Metadata Extraction 302 may operate to collaborate, from within the pipeline and based on detailed information extracted thus far, with other software facilities within a network (e.g., an enterprise policy engine in an enterprise network) to aggregate, enrich, and/or augment the extracted metadata (e.g., the enterprise policy engine may recursively feed analyzed attributes back into Object System Metadata Extraction 302).

Security Extraction 304 may operate to extract an object's security settings such as access permissions. Like system metadata, the security settings are a type of metadata that exist on objects which can be extracted, tagged, and classified via Classification Pipeline 300. The extracted security information can be useful for forensic and/or reporting purposes. For example, one might desire to know, while an object is being tagged, how many times the object had been accessed, when and perhaps by whom. In this way, access behavior may be analyzed based on the extracted security information and the historic value(s) associated therewith.

User Directory Extraction 306 may operate to extract system metadata pertaining to user directories associated with the object. User Directory Extraction 306 can enrich the extracted system metadata with directory information (e.g., the active directory where an object currently resides on a user computer).

Additional system-level processing is possible to extract from the keeper of an object other types of metadata germane to the structure (e.g., file type) of the object (e.g., "Sender" may be germane to "Email", "Author" may be germane to "Document", etc.). The keeper of the object refers to the system(s) on which the object resides. As an example, a client can simply plug in, insert or otherwise add new metadata extraction algorithm(s) or processing layer(s) to Classification Pipeline 300.

Content-based Metadata Processing 303 may comprise layers 308, 310, 312, 314, 316 and 318 for obtaining metadata on an object based upon the content of the object (e.g., free form text of an email or document, etc.). For example, Duplicate Hash Computation 308 may operate to perform a binary hash to detect possible duplicate objects which can then be removed (also called "deduplication"). In one embodiment, another layer (not shown) can be added to perform a text-based hash on the content of the object to see if it has changed semantically. This can be done before extractions 314, 316, 318.

Content Typing 310 may operate to determine the type of object by its content and not by its extension. As an example, a file named "work.doc" may be an .mp3 file in disguise. Determining the type of a document based on what's in it can help to ensure the accuracy of its classification.

Text Conversion 312 may operate to process and prepare the text of the object for content-based extraction operations (e.g., Keyword Extraction 314, Raw Entity Extraction 316, Text Pattern Extraction 318, etc.). Other content-based metadata extraction operations are also possible. As will be described below with reference to FIG. 4, in one embodiment, another layer or module can be added to remove any ambiguity (also called "the disambiguity" layer") in the content of the object. As one skilled in the art can appreciate, removing ambiguity (e.g., run-on sentences, improper punctuation, extra spaces, tables, dashes or hyphens in words and sentences, etc.) from the content can improve performance. The aforementioned text-based hashing can be performed on the converted text as well.

The converted text next is broken down into speech units (e.g., names, cities, nouns, verbs, etc.) and goes through a battery of extraction processes (e.g., Keyword Extraction 314, Raw Entity Extraction 316, Text Pattern Extraction 318, etc.). These layers of extraction operate to look for keywords, semantic entities, word units, expressions, text patterns, etc. and extract them from the text based on some predetermined parameters (e.g., a client desiring to locate documents discussing patient privacy might specify a list of relevant keywords such as "patient" and "privacy" based on which Keyword Extraction 314 is operable to go through the text and tag documents that contain those keywords). In some embodiments, third party text processing software development kits such as ThingFinder® by Inxight Software, Inc. of Sunnyvale, Calif. can be used to supplement this functionality. Inxight ThingFinder® can automatically identify tags and indexes about 35 types of named entities in a document, such as persons, organizations, dates, places, and addresses.

Entity Processing 305 may comprise layers 320, 322, and 324 for processing the object and/or metadata previously obtained from the object. In particular, the object and metadata previously obtained may be combined or analyzed to produce further metadata on the object. In embodiments disclosed herein, Filtering/Scoping 320 may operate to tag metadata according to predetermined scope(s)/filtering rule(s), which are user-definable. This can be useful in classifying objects in compliance with privacy policies and/or rules. With this functionality, objects may be included (scoping) and/or excluded (filtering) from one or more classes.

Proximity Analysis 322 may operate to tag or select an entity (metadata) based on its proximity or affinity to another entity or entities. For example, to distinguish from all dates a user may specify for Proximity Analysis 322 to find dates in proximity to a particular word or entity. As another example, to find names of people who work in hospitals, a user might first create an entity called "Hospital Names" and distinguish from all names only those that are in proximity to Hospital Names using Proximity Analysis 322. These are examples of proximity-based entities.

At this point, everything about an object is tagged and there could be a plurality of entities (extracted as well as created by the layers in the classification pipeline) of various types. User Level Entity Assertion 324 may operate to normalize these entities and interface with Object Classification Rules Engine 326 for submitting objects and their associated data. In this respect, User Level Entity Assertion 324 can be seen as interfacing between the tagging functionality and the classification functionality of Classification Pipeline 300. That is, an object may move up or through Classification Pipeline 300 as metadata concerning the object continues to be collected, enriched, and augmented. Once it reaches the last node, in this case, Proximity Analysis 322, the tagging aspect of the pipeline is done and User Level Entity Assertion 324 can assert all the data in its aggregate into Object Classification Rules Engine 326.

In one embodiment, Object Classification Rules Engine 326 is operable to classify objects according to a set of rules which define classes for objects based upon various data, metadata or various combinations associated therewith. Each object is classified based on its associated data according to these rules. These classification rules are user-definable and can be expressed in the form of conditions. In one embodiment, a condition has an attribute in terms of a value or value plus instances. In this way, if an object has an entity associated therewith that satisfies a condition, Object Classification Rules Engine 326 may classify that object to be a member of a class having that condition. Once the class membership is asserted, its class can be expressed in terms of another class (i.e., the class becomes the object's another attribute). This complex class membership can be interpreted subsequently during class processing.

It will be apparent to those skilled in the art that the stages or layers 302-326 depicted with respect to Classification Pipeline 300 are exemplary only, and that Classification Pipeline 300 may include more or fewer stages depending on the functionality of Classification Pipeline 300 desired. As an example, FIG. 3B depicts one embodiment of Classification Pipeline 330 comprising layers 332, 334, 336, 338, 340, 344, and 346 for operating on metadata spaces listed in Table 1 below. In one embodiment, layers 332, 334, 336, 338, 340, 344, and 346 are implemented as a set of tagging and extraction services available through a Web interface or an API interface.

TABLE 1

| Metadata Spaces | Description |
|---|---|
| Object System | Includes all core metadata acquired from the underlying system where an object resides and includes attributes such as size, creation date, and modified date. |
| Security | Contains all security information from an object. |
| User Directory | User and group mappings from the current directory of an object. |
| Content Signature | Contains a SHA-1 160 bit hash of the object being processed. |
| Content-based Typing | Contains a series of attributes representing the type of object derived from an analysis of the object's content. |
| Content Entities | Includes all entities that are located via text and natural language processing of the object's content. The scope of the entities to be extracted is based on the entities located within the active file classification(s) for the volume specified on the pipeline object classification request. Content-based Typing and Content Entities will be explained in more details below with reference to FIG. 4. |
| Object Classification | Indicates that the pipeline client wants specified objects to be classified against the file classification rules defined for the provided volume. |

In one embodiment, clients (e.g., application 100) of the classification pipeline (e.g., Classification Pipeline 110) can subscribe to specific metadata spaces listed above by defining a pipeline profile. If no pipeline profile is provided (e.g., request 102 contains no pipeline profile), the classification pipe may be configured to provide all sets of metadata.

In embodiments disclosed herein, any of the above-described layers and options of the classification pipeline can be turned on and off by metadata subscription. As an example, a client may choose to subscribe to a particular profile of the pipeline and configure it accordingly. As another example, a client may choose to tag an object but not classify it.

In some cases, a client may desire to have some dimensions of classification that is germane to a particular application domain, but not necessarily part of the classification pipeline. For example, a class may require its members to contain the name "Steve", be bigger than one megabyte in file size, be created over one year ago, mention a software product called "Classification Pipeline," and references the city of Austin. In one embodiment, a user can pass the classification requirements in from the application domain to the classification engine (e.g., Object Classification Rules Engine 326) and the classification pipeline (e.g., Classification Pipeline 300) can synthesize the user-defined classification requirements with all the tag attributes (e.g., name, size, date, text pattern, keyword, etc.) and feed them into the classification engine to assert classification accordingly. In this way, classification can be done based on dynamically inserted requirements from external applications.

Figure 4:
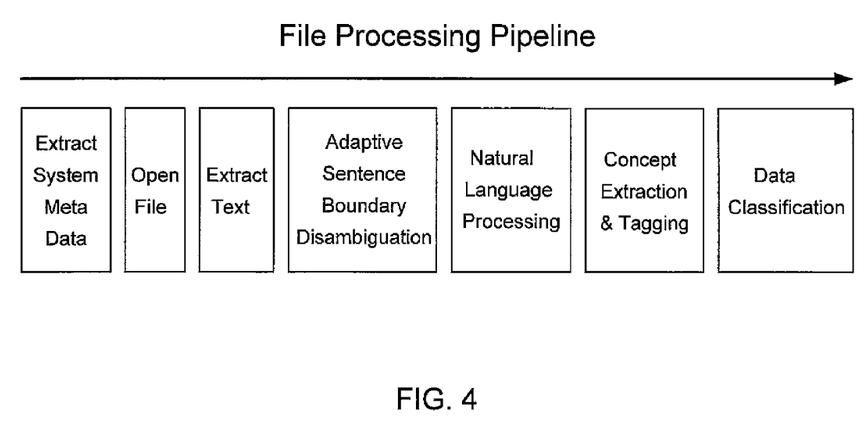
FIG. 4 depicts a flow chart illustrating one embodiment of a method for adaptive sentence boundary disambiguation.

FIG. 4 depicts a flow chart illustrating one embodiment of a method for adaptive sentence boundary disambiguation. The flow chart exemplifies the processing stack which one embodiment of a system may execute for each data object (e.g., a file). Each phase of the flow will be briefly described to provide context to the adaptive sentence boundary disambiguation functionality or "layer" of the processing stack.

Extract System Meta Data—at this layer, metadata is extracted from the system that manages the data object being processed. In one embodiment, this can be a "stat" call on a file system that extracts all system metadata from "around" the data object. On a file system this can include: access time, modified time, size, owner, etc.

Open File—this functionality can open up the file to be read for content processing.

Extract Text—this functionality can extract text (user viewable as well as non-user viewable) from a document, essentially discarding all formatting information, so that tagging of interesting search terms and concepts can be extracted. Examples of non-user viewable text include hidden columns and rows in a spreadsheet, tracking information in a word processing document, potentially blackened out data in a .PDF (portable document format) document, etc.

Adaptive Sentence Boundary Disambiguation—this functionality can "pre-process" the extracted text for processing by the Natural Language Processing layer. Natural Language Processing engines operate to break down the sentences, normalized with unambiguous boundaries, into their parts of speech in order to obtain sufficient context to distinguish certain "concepts" from one another. This functionality can be particularly useful in processing text extracted from business documents in an enterprise environment as it can address the following issues: malformed bulleted lists, runaway sentence identification, and spatially separated data. In one embodiment, when one of these malformed sentences is encountered, a "?" character is inserted to signify to the Natural Language Processing layer that this set of "words" represent a logical construct and should be evaluated independently of other sentences. Examples of this normalization process are provided below. Without this layer of pre-processing, the Natural Language Processing layer would erroneously produce concepts that spanned sentences and logical thought boundaries yielding false positive concept extraction assertions.

Natural Language Processing (NLP)—this functionality can break down "sentences" into their parts of speech.

Concept Extraction and Tagging—this functionality can extract concepts like names of people, cities, addresses, and so on, leveraging the context provided by the NLP layer.

Data Classification—this functionality can execute a rule-based expression evaluation across the set of Tagged Concepts and Entities. Once data objects are classified, one embodiment of the aforementioned Classification Pipeline can automate policies against data that meets these classifications.

Example 1

Extracted text with no sentence boundary:

| The following members received plaques and awards: | |
|---|---|
| Marlys Nelson | President |
| Gary Brandau | Vice-President |
| Cindy Houlson | Treasurer |
| Wendel Reece | Secretary |
| Steve Theisen | Most Attendance by a non-Officer |
| New Officers | |
| New Officers for the 2003-2004 year are: | |
| Gary Brandau | President |
| Cindy Houlson | Vice President |
| Jeff Bortcheller | Treasurer |
| Wendel Reece | Secretary |

After application of the second heuristic algorithm, the extracted text is disambiguated with normalized, unambiguous sentence boundaries:

The following members received plaques and awards: Marlys Nelson President ? Gary Brandau Vice-President ? Cindy Houlson Treasurer ? Wendel Reece Secretary Steve Theisen Most Attendance by a non-Officer New Officers New Officers for the 2003-2004 year are: Gary Brandau President Cindy Houlson Vice President Jeff Bortcheller Treasurer Wendel Reece Secretary Example 2

Extracted text with no sentence boundary:

Briefing Overview
Introduction of Speakers
Contract differences
Contract Goals
Communication
TRO Organizational Chart
TRO Major Functions
Satellite Locations
Prime Travel Benefit Program
Humana Overview
Humana Military
Culture
Past Performance
Humana Military Organizational structure
New Processes
Common Beneficiary Concerns
Customer Service Phone Numbers
Web Resources
TRICARE Information Portal
TSCs
PGBA Services
Priority Customers After application of the second heuristic algorithm, the extracted text is disambiguated with normalized, unambiguous sentence boundaries:

? Briefing Overview ? Introduction of Speakers ? Contract differences ? Contract Goals ? Communication ? TRO Organizational Chart ? TRO Major Functions ? Satellite Locations Prime Travel Benefit Program ? ? ? Humana Overview ? Humana Military ? Culture ? Past Performance Humana Military Organizational structure New Processes Common Beneficiary Concerns Customer Service Phone Numbers Web Resources ? TRICARE Information Portal ? TSCs ? PGBA Services ? Priority Customers ? ? ?

Example 3

Extracted text with no sentence boundary:

| Important Names | Column |
|---|---|
| Adam Bonner | Smith |
| Kurt Wonnegut | Jefferson |
| John Doe | Adams |
| Sammy Davis | Washington |
| Bart Conner | Lincoln |
| Keith Zoeller | Roosevelt |
| Larry Harkrider | McKinley |

After application of the second heuristic algorithm, the extracted text is disambiguated with normalized, unambiguous sentence boundaries:

Important Names Column ? Adam Bonner Smith ? Kurt Wonnegut Jefferson ? John Doe Adams ? Sammy Davis Washington ? Bart Conner Lincoln ? Keith Zoeller Roosevelt ? Larry Harkrider McKinley

Example 4

Extracted text with no sentence boundary:

Adam Bonner
Smith
Bart Conner
Jefferson
Curt Donner
Adams

After application of the second heuristic algorithm, the extracted text is disambiguated with normalized, unambiguous sentence boundaries:

? Adam Bonner? ? ? ? ? Smith ? Bart Conner? ? ? ? ? Jefferson ? Curt Donner? ? ? ? ? Adams ? ? ? ? ? ? ? ?

Example 5

Extracted text with no sentence boundary:

Volume 33 Number 42
Saturday, Oct. 18, 2003 • Harrisburg, Pa.
Pages 5163-5284
Agencies in this issue:
The General Assembly
The Courts
Department of Banking
Department of Environmental Protection
Department of General Services
Department of Health
Department of Public Welfare
Department of Transportation
Environmental Quality Board
Housing Finance Agency
Insurance Department
Legislative Reference Bureau
Liquor Control Board
Pennsylvania Public Utility Commission
State Board of Pharmacy
Turnpike Commission
Detailed list of contents appears inside.
PRINTED ON 100% RECYCLED PAPER
Latest Pennsylvania Code Reporter
(Master Transmittal Sheet):
No. 347, October 2003
PENNSYLVANIA
Postmaster send address changes to:
FRY COMMUNICATIONS
Attn: Pennsylvania Bulletin
800 W. Church Rd.
Mechanicsburg, Pennsylvania 17055-3198
(717) 766-0211 ext. 2340
(800) 334-1429 ext. 2340 (toll free, out-of-State)
(800) 524-3232 ext. 2340 (toll free, in State)
published weekly by Fry Communications, Inc. for the
Commonwealth of Pennsylvania, Legislative Reference Bureau,
647 Main Capitol Building, State & Third Streets,
Harrisburg, Pa. 17120, under the policy supervision and
direction of the Joint Committee on Documents pursuant to
Part II of Title 45 of the Pennsylvania Consolidated
Statutes (relating to publication and effectiveness
of Commonwealth Documents).
Subscription rate $82.00 per year,
postpaid to points in the United States. Individual copies
$2.50. Checks for subscriptions and individual copies
should be made payable to "Fry Communications, Inc."
Periodicals postage paid at Harrisburg, Pennsylvania.
Orders for subscriptions and other circulation matters
should be sent to:

After application of the second heuristic algorithm, the extracted text is disambiguated with normalized, unambiguous sentence boundaries:

Volume 33? ? ? ? ? Number 42 Saturday, Oct. 18, 2003 • Harrisburg, Pa. Pages 5163-5284 ? Agencies in this issue: ? The General Assembly ? The Courts ? Department of Banking Department of Environmental Protection Department of General Services Department of Health Department of Public Welfare Department of Transportation ? Environmental Quality Board ? Housing Finance Agency ? Insurance Department ? Legislative Reference Bureau ? Liquor Control Board Pennsylvania Public Utility Commission State Board of Pharmacy Turnpike Commission Detailed list of contents appears inside. PRINTED ON 100% RECYCLED PAPER Latest Pennsylvania Code Reporter (Master Transmittal Sheet): No. 347, October 2003 PENNSYLVANIA Postmaster send address changes to: FRY COMMUNICATIONS ? Attn: Pennsylvania Bulletin ? 800 W. Church Rd. Mechanicsburg, Pennsylvania 17055-3198 ? (717) 766-0211 ext. 2340 (800) 334-1429 ext. 2340 (toll free, out-of-State) (800) 524-3232 ext. 2340 (toll free, in State) published weekly by Fry Communications, Inc. for the Commonwealth of Pennsylvania, Legislative Reference Bureau, 647 Main Capitol Building, State & Third Streets, Harrisburg, Pa. 17120, under the policy supervision and direction of the Joint Committee on Documents pursuant to Part II of Title 45 of the Pennsylvania Consolidated Statutes (relating to publication and effectiveness of Commonwealth Documents). Subscription rate $82.00 per year, postpaid to points in the United States. Individual copies $2.50. Checks for subscriptions and individual copies should be made payable to "Fry Communications, Inc." Periodicals postage paid at Harrisburg, Pennsylvania. Orders for subscriptions and other circulation matters should be sent to:

As persons of ordinary skill in the art can appreciate, embodiments disclosed herein can be implemented by computer executable program instructions. Such computer executable program instructions may be embodied on a computer-readable storage medium to produce an article of manufacture particular to one or more functions disclosed herein. Additionally, such computer executable program instructions may be loaded onto a general-purpose computer, special purpose computer, or other programmable data processing device(s) to produce a machine. These computer executable program instructions when executed by a processor of the machine implement the functions specified in the present disclosure. These computer executable program instructions may be stored on a computer memory and/or data storage device(s) and may be executed to direct a computer or the like to function in a manner particular to embodiments disclosed herein. These computer executable program instructions may be written in any suitable computer programming languages such as C, C++, Java, etc. The necessary programming techniques are known to those skilled in the art and thus are not further described herein.

Although the present invention has been described in detail herein with reference to the illustrative embodiments, it should be understood that the description is by way of example only and not to be construed in a limiting sense. It is to be further understood, therefore, that numerous changes in the details of the embodiments disclosed herein and additional embodiments will be apparent to, and may be made by, persons of ordinary skill in the art having reference to this description. It is contemplated that all such changes and additional embodiments are within the scope of the present disclosure as set forth in the following claims and their legal equivalents.

What is claimed is:

1. A method for adaptive sentence boundary disambiguation, comprising:
receiving, from a natural language processing system, a document containing text;
identifying, by a first heuristic algorithm, sentence text in the document;
identifying, by a second heuristic algorithm, non-sentence text in the document, wherein the second heuristic algorithm is operable to identify one of non-sentence texts in a group consisting of lists, tables, names of people, addresses, text without a sentence structure, text included as a list and spatially separated data as non-sentence text;
parsing said non-sentence text into one or more logical constructs, wherein each logical construct comprises a set of words;
inserting a disambiguator after each of said one or more logical constructs to define a sentence boundary for the logical construct based on one or more natural language structures; and
sending the disambiguated document to the natural language processing system, wherein the disambiguated document consists of disambiguated sentences, each disambiguated sentence having a defined boundary and including related contextual information, and the disambiguator is used to signal the natural language processing system the presence of a logical construct to be evaluated independently of other logical constructs.

2. The method according to claim 1, wherein metadata indicates the document includes a list.

3. The method according to claim 1, wherein the disambiguator comprises a question mark.

4. The method according to claim 1, further comprising processing said non-sentence text to extract concepts from said one or more logical constructs.

5. The method according to claim 1, further comprising determining whether a predetermined number of consecutive lines in said document contain a number of words that is equal to or less than a threshold, wherein said predetermined number and said threshold are configurable.

6. The method according to claim 1, further comprising determining whether words in said document are separated by a predetermined number of consecutive spaces or tabs, wherein said predetermined number is configurable.

7. The method according to claim 1, further comprising determining whether there are consecutive words in said document that equal to or exceed a predetermined number without a proper end-of-sentence mark, wherein said predetermined number is configurable.

8. A non-transitory computer-readable storage medium carrying computer-executable program instructions translatable to implement a method for adaptive sentence boundary disambiguation, comprising:
receiving, from a natural language processing system, a document containing text;
identifying, by a first heuristic algorithm, sentence text in the document;
identifying, by a second heuristic algorithm, non-sentence text in the document, wherein the second heuristic algorithm is operable to identify one of non-sentence texts in a group consisting of lists, tables, names of people, addresses, text without a sentence structure, text included as a list and spatially separated data as non-sentence text;
parsing said non-sentence text into one or more logical constructs, wherein each logical construct comprises a set of words;
inserting a disambiguator after each of said one or more logical constructs to define a sentence boundary for the logical construct based on one or more natural language structures, and
sending the disambiguated document to the natural language processing system, wherein the disambiguated document consists of disambiguated sentences, each disambiguated sentence having a defined boundary and including related contextual information, and the disambiguator is used to signal the natural language processing system the presence of a logical construct to be evaluated independently of other logical constructs.

9. The non-transitory computer-readable storage medium of claim 8, wherein metadata indicates the document includes a list.

10. The non-transitory computer-readable storage medium of claim 8, wherein the disambiguator comprises a question mark.

11. The non-transitory computer-readable storage medium of claim 10, wherein said computer-executable program instructions are further translatable to determine whether a predetermined number of consecutive lines in said document contain a number of words that is equal to or less than a threshold, wherein said predetermined number and said threshold are configurable.

12. The non-transitory computer-readable storage medium of claim 10, wherein said computer-executable program instructions are further translatable to determine whether words in said document are separated by a predetermined number of consecutive spaces or tabs, wherein said predetermined number is configurable.

13. The non-transitory computer-readable storage medium of claim 10, wherein said computer-executable program instructions are further translatable to determine whether there are consecutive words in said document that equal to or exceed a predetermined number without a proper end-of-sentence mark, wherein said predetermined number is configurable.

14. A system for adaptive sentence boundary disambiguation, comprising:
    a processor;
    a computer-readable storage medium accessible by said processor and carrying program instructions executable by said processor to:
        receive, from a natural language processing system, a document containing text;
        identify, by a first heuristic algorithm, sentence text in the document;
        identify, by a second heuristic algorithm, non-sentence text in the document, wherein the second heuristic algorithm is operable to identify one of non-sentence texts in a group consisting of lists, tables, names of people, addresses, text without a sentence structure, text included as a list and spatially separated data as non-sentence text;
        parse said non-sentence text into one or more logical constructs, wherein each logical construct comprises a set of words; and
        insert a disambiguator after each of said one or more logical constructs to define a sentence boundary for the logical construct based on one or more natural language structures and
        send the disambiguated document to the natural language processing system, wherein the disambiguated document consists of disambiguated sentences, each disambiguated sentence having a defined boundary and including related contextual information, and the disambiguator is used to signal the natural language processing system the presence of a logical construct to be evaluated independently of other logical constructs.

15. The system of claim 14, wherein the disambiguator comprises a question mark.

16. The system of claim 14, wherein said program instructions are further executable by said processor to determine whether a predetermined number of consecutive lines in said document contain a number of words that is equal to or less than a threshold, wherein said predetermined number and said threshold are configurable.

17. The system of claim 14, wherein said program instructions are further executable by said processor to determine whether words in said document are separated by a predetermined number of consecutive spaces or tabs, wherein said predetermined number is configurable.

18. The system of claim 14, wherein said program instructions are further executable by said processor to determine whether there are consecutive words in said document that equal to or exceed a predetermined number without a proper end-of-sentence mark, wherein said predetermined number is configurable.

* * * * *